US012211418B2

(12) United States Patent
Chan et al.

(10) Patent No.: US 12,211,418 B2
(45) Date of Patent: Jan. 28, 2025

(54) DISPLAY DATA ADJUSTMENT METHOD

(71) Applicant: Innolux Corporation, Miaoli County (TW)

(72) Inventors: Chien-Hung Chan, Miaoli County (TW); Meng-Chang Tsai, Miaoli County (TW); Huang-Chi Chao, Miaoli County (TW); Chan-Feng Chiu, Miao-Li County (TW); Shiau-Ting Haung, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 198 days.

(21) Appl. No.: 17/993,836

(22) Filed: Nov. 23, 2022

(65) Prior Publication Data

US 2023/0206815 A1 Jun. 29, 2023

(30) Foreign Application Priority Data

Dec. 28, 2021 (CN) ......................... 202111631908.9

(51) Int. Cl.
*G09G 3/20* (2006.01)

(52) U.S. Cl.
CPC ... *G09G 3/2074* (2013.01); *G09G 2320/0666* (2013.01); *G09G 2340/06* (2013.01); *G09G 2360/16* (2013.01)

(58) Field of Classification Search
CPC ......... G09G 3/2074; G09G 2320/0666; G09G 2360/16; G09G 2340/06; G09G 2300/0452; G09G 2320/0242; G09G 3/2003; G09G 3/20
See application file for complete search history.

(56) References Cited

U.S. PATENT DOCUMENTS

| | | | | |
|---|---|---|---|---|
| 9,940,870 | B2 * | 4/2018 | Yano | G09G 3/3208 |
| 10,176,745 | B2 * | 1/2019 | Kang | G06T 5/92 |
| 2014/0035970 | A1 * | 2/2014 | Chu Ke | G09G 3/32<br>345/694 |
| 2018/0174535 | A1 * | 6/2018 | Chen | G09G 3/3611 |

(Continued)

FOREIGN PATENT DOCUMENTS

| | | | | |
|---|---|---|---|---|
| CN | 105047179 A | * | 11/2015 | |
| CN | 105575314 A | * | 5/2016 | G09G 3/20 |

(Continued)

*Primary Examiner* — Ricardo Osorio
(74) *Attorney, Agent, or Firm* — JCIPRNET

(57) ABSTRACT

A display data adjustment method is provided, including the following. First display data is received, and first grayscale values of first sub-pixels of different colors in the first display data are converted from a first color gamut space into color values in a second color gamut space. First weight values are generated according to the color values. Lookup tables are compared according to the first grayscale values of the first sub-pixels to obtain groups of first high grayscale values and first low grayscale values corresponding to the first sub-pixels. Second high grayscale values and second low grayscale values are obtained by calculation according to the groups of the first high grayscale values and the first low grayscale values and the first weight values. The second high grayscale values or the second low grayscale values are selected as second grayscale values of second sub-pixels in second display data.

19 Claims, 12 Drawing Sheets

(56) References Cited

U.S. PATENT DOCUMENTS

| | | | | |
|---|---|---|---|---|
| 2018/0315381 | A1* | 11/2018 | Zha | G09G 3/2003 |
| 2019/0325817 | A1* | 10/2019 | Yano | G09G 3/3208 |
| 2020/0404124 | A1* | 12/2020 | Yu | H04N 1/6066 |
| 2021/0398494 | A1* | 12/2021 | Kwon | G09G 3/3291 |
| 2023/0074524 | A1* | 3/2023 | Peng | G09G 3/2014 |
| 2024/0046896 | A1* | 2/2024 | Wang | G09G 3/3607 |

FOREIGN PATENT DOCUMENTS

| | | | | | |
|---|---|---|---|---|---|
| CN | 107657930 | A | * | 2/2018 | G09G 3/3607 |
| CN | 110599938 | A | * | 12/2019 | G09G 3/2074 |
| CN | 110970000 | A | * | 4/2020 | G09G 3/36 |
| CN | 111540325 | | | 8/2020 | |
| CN | 113066429 | A | * | 7/2021 | G09F 9/33 |
| CN | 114049860 | A | * | 2/2022 | G09G 3/20 |
| CN | 115188337 | A | * | 10/2022 | |
| EP | 3016369 | A1 | * | 5/2016 | G06K 9/4652 |

* cited by examiner

610

| Grayscale value | R | | G | | B | |
|---|---|---|---|---|---|---|
| | RH | RL | GH | GL | BH | BL |
| 60 | 71 | 52 | 65 | 55 | 62 | 58 |
| 89 | 101 | 80 | 97 | 81 | 94 | 84 |
| 170 | 198 | 155 | 195 | 160 | 182 | 165 |

611 612 613

FIG. 6A

620

| Grayscale value | R | | G | | B | |
|---|---|---|---|---|---|---|
| | RH | RL | GH | GL | BH | BL |
| 60 | 80 | 44 | 92 | 17 | 71 | 3 |
| 89 | 120 | 68 | 130 | 50 | 115 | 47 |
| 170 | 230 | 123 | 224 | 140 | 218 | 152 |

621 622 623

FIG. 6B

630

| Grayscale value | R | | G | | B | |
|---|---|---|---|---|---|---|
| | RH | RL | GH | GL | BH | BL |
| 60 | 71 | 52 | 65 | 55 | 62 | 58 |
| 89 | 101 | 80 | 97 | 81 | 94 | 84 |
| 170 | 198 | 155 | 195 | 160 | 182 | 165 |

631 632 633

FIG. 6C

640

| Grayscale value | R | | G | | B | |
|---|---|---|---|---|---|---|
| | RH | RL | GH | GL | BH | BL |
| 60 | 80 | 44 | 92 | 17 | 71 | 3 |
| 89 | 120 | 68 | 130 | 50 | 115 | 47 |
| 170 | 230 | 123 | 224 | 140 | 218 | 152 |

641 642 643

FIG. 6D

650

| Grayscale value | R | | G | | B | |
|---|---|---|---|---|---|---|
| | RH | RL | GH | GL | BH | BL |
| 10 | 15 | 7 | 14 | 7 | 13 | 7 |
| 60 | 71 | 52 | 65 | 55 | 62 | 58 |
| 170 | 198 | 155 | 195 | 160 | 182 | 165 |

651 652 653

FIG. 6E

660

| Grayscale value | R | | G | | B | |
|---|---|---|---|---|---|---|
| | RH | RL | GH | GL | BH | BL |
| 10 | 20 | 4 | 18 | 5 | 17 | 0 |
| 60 | 80 | 44 | 92 | 17 | 71 | 3 |
| 170 | 230 | 123 | 224 | 140 | 218 | 152 |

661 662 663

FIG. 6F

910

| Grayscale value | R | | G | | B | |
|---|---|---|---|---|---|---|
| | RH | RL | GH | GL | BH | BL |
| 0 | 0 | 0 | 0 | 0 | 0 | 0 |
| 25 | 101 | 7 | 44 | 14 | 29 | 22 |
| 100 | 198 | 80 | 125 | 77 | 105 | 97 |

911 912 913

FIG. 9A

920

| Grayscale value | R | | G | | B | |
|---|---|---|---|---|---|---|
| | RH | RL | GH | GL | BH | BL |
| 0 | 0 | 0 | 0 | 0 | 0 | 0 |
| 25 | 41 | 14 | 48 | 11 | 30 | 19 |
| 100 | 115 | 82 | 138 | 75 | 107 | 95 |

921 922 923

FIG. 9B

930

| Grayscale value | R | | G | | B | |
|---|---|---|---|---|---|---|
| | RH | RL | GH | GL | BH | BL |
| 0 | 0 | 0 | 0 | 0 | 0 | 0 |
| 25 | 50 | 8 | 30 | 19 | 35 | 17 |
| 100 | 110 | 88 | 120 | 81 | 115 | 97 |

931 932 933

FIG. 9C

940

| Grayscale value | R | | G | | B | |
|---|---|---|---|---|---|---|
| | RH | RL | GH | GL | BH | BL |
| 0 | 0 | 0 | 0 | 0 | 0 | 0 |
| 25 | 60 | 2 | 28 | 22 | 31 | 18 |
| 100 | 125 | 74 | 115 | 88 | 106 | 93 |

941 943 943

FIG. 9D

DISPLAY DATA ADJUSTMENT METHOD

CROSS-REFERENCE TO RELATED APPLICATION

This application claims the priority benefit of Chinese application no. 202111631908.9, filed on Dec. 28, 2021. The entirety of the above-mentioned patent application is hereby incorporated by reference herein and made a part of this specification.

BACKGROUND

Technical Field

The disclosure relates to data adjustment technology. In particular, the disclosure relates to a display data adjustment method.

Description of Related Art

With the evolution of display technology, requirements for image quality and resolution displayed by a display device are gradually increasing. However, different human eyes viewing a display device perceive different results, particularly an influence of color shift in a side view of a display image and a sense of graininess of the image. In this regard, it is not possible for a conventional display device to dynamically adjust a display content for the color shift influences so as to provide a method for corresponding adjustment or effective improvement.

SUMMARY

The disclosure is directed to a display data adjustment method, in which a display device provides good displaying according to adjusted display data.

According to an embodiment of the disclosure, a display data adjustment method includes the following. First display data is received, and a plurality of first grayscale values of a plurality of first sub-pixels of different colors in the first display data are converted from a first color gamut space into a plurality of color values in a second color gamut space. A plurality of first weight values are generated according to the plurality of color values. A plurality of lookup tables are compared according to the plurality of first grayscale values of the plurality of first sub-pixels to obtain a plurality of groups of a plurality of first high grayscale values and a plurality of first low grayscale values corresponding to the plurality of first sub-pixels. A plurality of second high grayscale values and a plurality of second low grayscale values are obtained by calculation according to the plurality of groups of the plurality of first high grayscale values and the plurality of first low grayscale values and the plurality of first weight values. The plurality of second high grayscale values or the plurality of second low grayscale values are selected as a plurality of second grayscale values of a plurality of second sub-pixels in second display data.

Based on the foregoing, the display data adjustment method according to the embodiments of the disclosure can automatically adjust display data to dynamically adjust electrical low color shift (ELCS) of the display device to improve displaying.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6A to FIG. 6B are schematic diagrams of a first example of comparing a lookup table according to grayscale values according to an embodiment of the disclosure.

FIG. 6C to FIG. 6D are schematic diagrams of a second example of comparing a lookup table according to grayscale values according to an embodiment of the disclosure.

FIG. 6E to FIG. 6F are schematic diagrams of a third example of comparing a lookup table according to grayscale values according to an embodiment of the disclosure.

FIG. 9A to FIG. 9D are schematic diagrams of comparing a lookup table according to grayscale values according to another embodiment of the disclosure.

DESCRIPTION OF THE EMBODIMENTS

Figure 1:
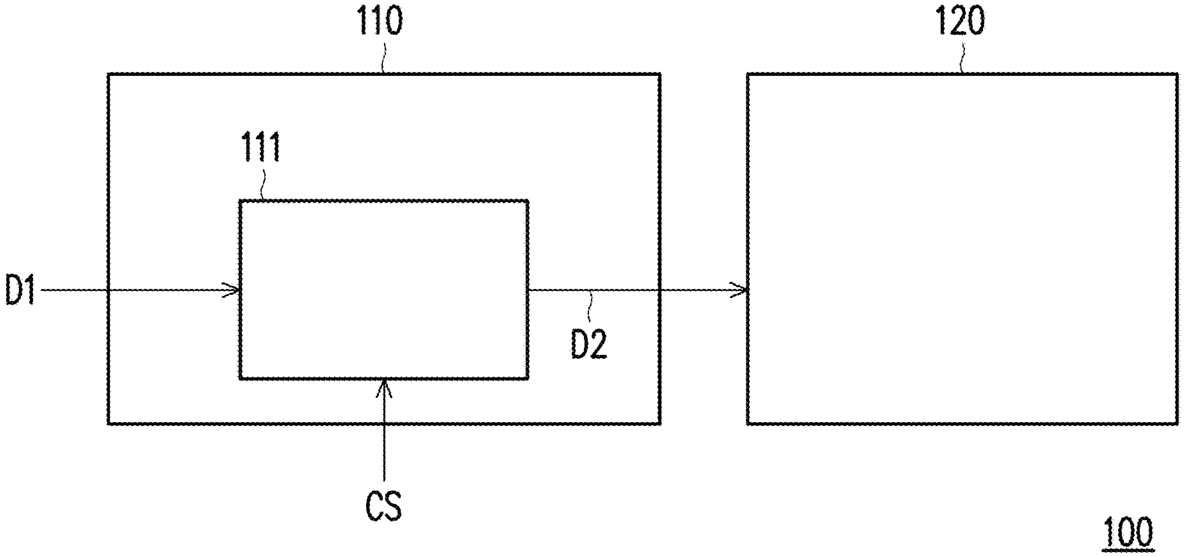
FIG. 1 is a schematic diagram of a display device according to an embodiment of the disclosure.

Reference will now be made in detail to the exemplary embodiments of the disclosure, examples of which are described in the accompanying drawings. Wherever possible, the same reference numerals are used in the drawings and the description to refer to the same or similar parts.

The disclosure may be understood with reference to the following detailed description together with the drawings. Note that for ease of understanding and simplicity of drawings, the drawings of the disclosure show a part of an electronic device, and certain elements in the drawings may not be drawn to scale. In addition, the number and size of each element shown in the drawings only serve for exemplifying instead of limiting the scope of the disclosure.

Throughout the description of the disclosure and the appended claims, certain terms are used to refer to specific elements. Those skilled in the art should understand that electronic device manufacturers may refer to the same elements by different names. It is not intended herein to distinguish between elements that have the same function but different names. In the following description and claims, the terms “comprise” and “include” are open-ended terms, and should thus be interpreted to mean “comprise but not limited to . . . ”.

In some embodiments of the disclosure, unless specifically defined, terms related to bonding and connection such as “connect”, “interconnect”, and so on may mean that two structures are in direct contact, or that two structures are not in direct contact and another structure is provided in between. In addition, the terms related to bonding and connection may also cover cases where two structures are both movable or two structures are both fixed. Moreover, terms “electrically connect” and “couple” includes any direct and indirect electrical connection means.

In the description and claims, the use of an ordinal number such as “first”, “second”, and so on to modify an element does not by itself connote or represent any preceding ordinal number of the element(s); any priority, precedence, or order of one element over another; or the order in which a manufacturing method is performed, but only to clearly distinguish an element having a certain name from another element having the same name. The same terms may be not used in the claims as used in the description, and accordingly a first member in the description may be a second member in the claims. It should be noted that technical features in different embodiments described below can be replaced, recombined, or mixed with one another to constitute another embodiment without departing from the spirit of the disclosure.

It should be noted that technical features in different embodiments described below can be replaced, recombined, or mixed with one another to constitute another embodiment without departing from the spirit of the disclosure. The features in various embodiments can be arbitrarily mixed and combined for use without departing from or conflicting with the spirit of the disclosure.

In the disclosure, the electronic device may include, but is not limited to, a display device, an antenna device, a sensing device, or a tiled device. The electronic device may be a bendable or flexible electronic device. The electronic device may include, for example but not limited to, liquid crystals, light-emitting diodes, quantum dots (QD), fluorescence, phosphor, other suitable materials, or a combination of the above materials. The light-emitting diode may include, for example but not limited to, an organic light-emitting diode (OLED), a mini LED, a micro LED, or a quantum dot light-emitting diode (QLED or QDLED). The antenna device may be, for example but not limited to, a liquid crystal antenna. The tiled device may be, for example but not limited to, a tiled display device or a tile antenna device. It should be noted that the electronic device may be arbitrary arrangement and combination of the above, but is not limited thereto. A display device will be adopted as the electronic device for describing the disclosure below, but the disclosure is not limited thereto.

FIG. 1 is a schematic diagram of a display device according to an embodiment of the disclosure. With reference to FIG. 1, an electronic device 100 includes a controller 110 and a display panel 120. The controller 110 is coupled to the display panel 120. In this embodiment, the controller 110 may include a display data adjustment module 111. The controller 110 may be a timing controller (TCON), for example, and the display data adjustment module 111 may be implemented by circuits, firmware, and/or software programs in the controller 110, but the disclosure is not limited thereto. In this embodiment, the display data adjustment module 111 may receive first display data D1 from the outside, and generate second display data D2 after data adjustment. The display panel 120 may receive the second display data D2 to adjust a display image, for example, to render the display image with electrical low color shift (ELCS).

Figure 2A:
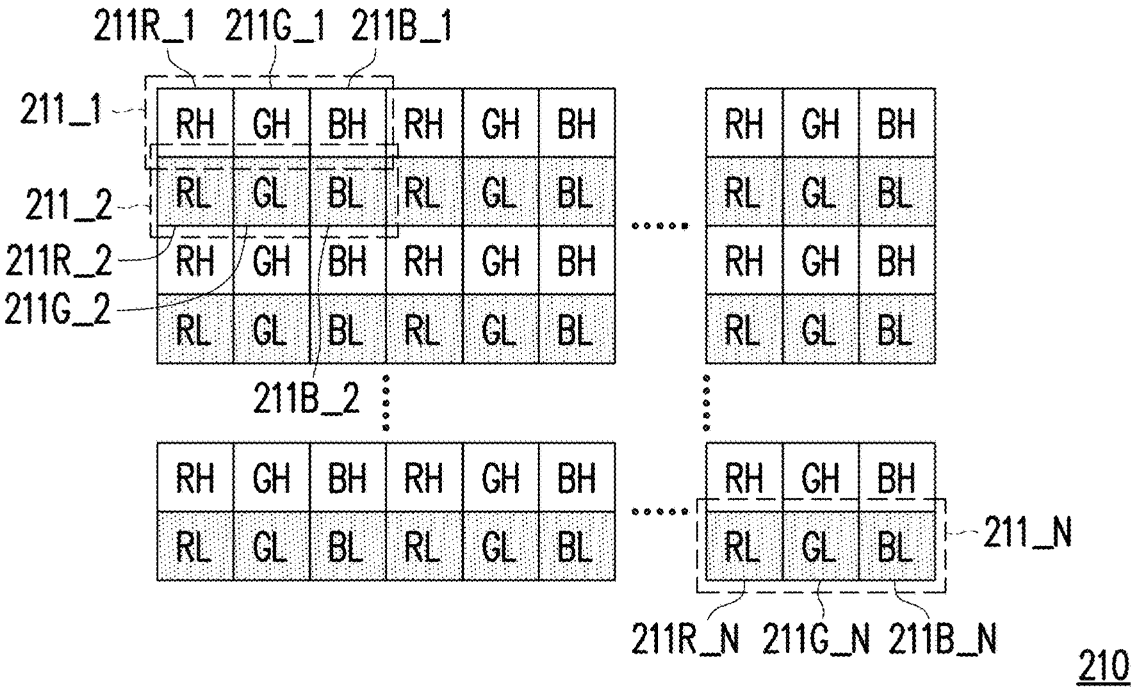
FIG. 2A is a schematic diagram of a pixel array according to an embodiment of the disclosure.

FIG. 2A is a schematic diagram of a pixel array according to an embodiment of the disclosure. With reference to FIG.

2A, firstly, in some embodiments of the disclosure, the display panel 120 of FIG. 1 may include a pixel array 210 as shown in FIG. 2A. The pixel array 210 includes a plurality of pixels 211_1 to 211_N, where N is a positive integer. The pixels 211_1 to 211_N may include a plurality of sub-pixels 211R_1 to 211R N, 211G_1 to 211G N, and 211B_1 to 211B N. Each of the pixels 211_1 to 211_N may include a plurality of sub-pixels, such as a red sub-pixel, a green sub-pixel, and a blue sub-pixel, but the disclosure is not limited thereto. The pixel array 210 may realize electrical low color shift in a space, so a part of the pixels 211_1 to 211_N may be defined as a high grayscale pixel type (displaying high grayscales), and another part of the pixels 211_1 to 211_N may be defined as a low grayscale pixel type (displaying low grayscales). In some embodiments, the sub-pixels 211R_1, 211G_1, and 211B_1 of the pixel 211_1 are each a sub-pixel of the high grayscale pixel type, for example, and the sub-pixels 211R_2, 211G_2, and 211B_2 of the pixel 211_2 are each a sub-pixel of the low grayscale pixel type, for example. By analogy, as shown in FIG. 2A, the sub-pixels of the high grayscale pixel type and the sub-pixels of the low grayscale pixel type are alternately arranged in a manner of line insertion.

Figure 2B:
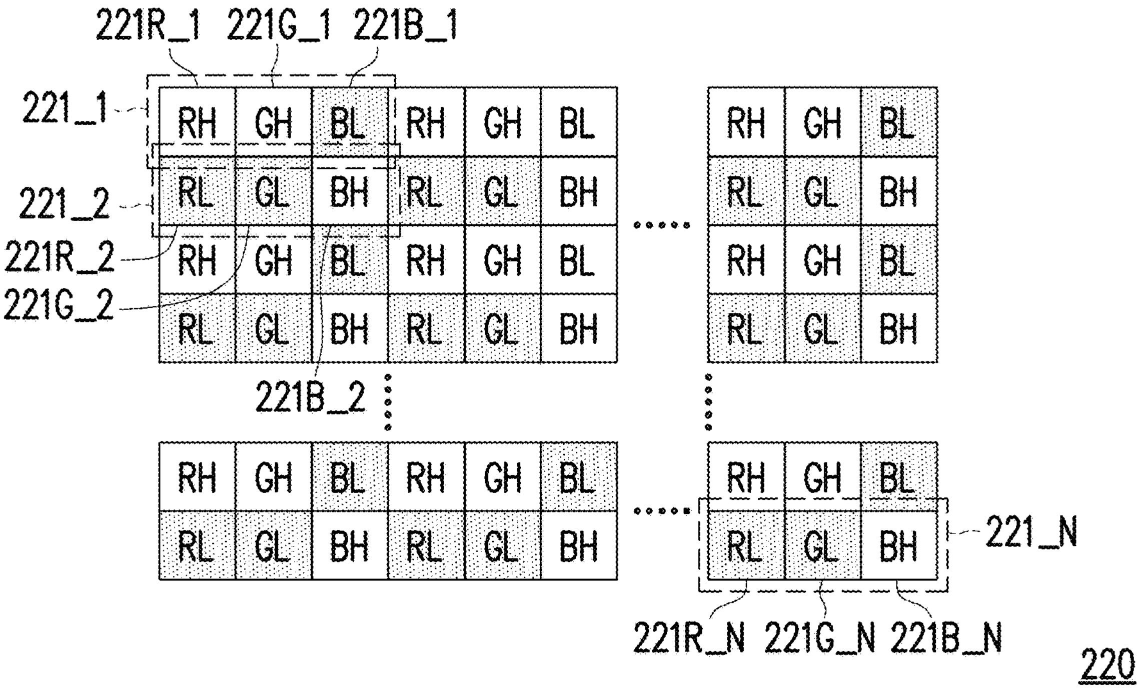
FIG. 2B is a schematic diagram of a pixel array according to another embodiment of the disclosure.

FIG. 2B is a schematic diagram of a pixel array according to another embodiment of the disclosure. With reference to FIG. 2B, firstly, in some embodiments of the disclosure, the display panel 120 of FIG. 1 may include a pixel array 220 as shown in FIG. 2B. The pixel array 220 includes a plurality of pixels 221_1 to 221_N, where N is a positive integer. The pixels 221_1 to 221_N may include a plurality of sub-pixels 221R_1 to 221R_N, 221G_1 to 221G_N, and 221B_1 to 221B N. Each of the pixels 221_1 to 221_N may include a plurality of sub-pixels, such as a red sub-pixel, a green sub-pixel, and a blue sub-pixel, but the disclosure is not limited thereto. The pixel array 220 may realize electrical low color shift in a space, so a part of the pixels 221_1 to 221_N may be defined as a high grayscale pixel type (displaying high grayscales), and another part of the pixels 221_1 to 221_N may be defined as a low grayscale pixel type (displaying low grayscales). In this regard, the sub-pixels 221R_1 and 221G_1 of the pixel 221_1 are each a sub-pixel of the high grayscale pixel type, for example, and the sub-pixel 221B_1 of the pixel 221_1 is of the low grayscale pixel type, for example. The sub-pixels 221R_2 and 221G_2 of the pixel 221_2 are each a sub-pixel of the low grayscale pixel type, for example, and the sub-pixel 221B_2 of the pixel 221_2 is of the high grayscale pixel type, for example. By analogy, as shown in FIG. 2B, the sub-pixels of the high grayscale pixel type and the sub-pixels of the low grayscale pixel type are alternately arranged in a manner of 2-dot insertion.

Figure 3:
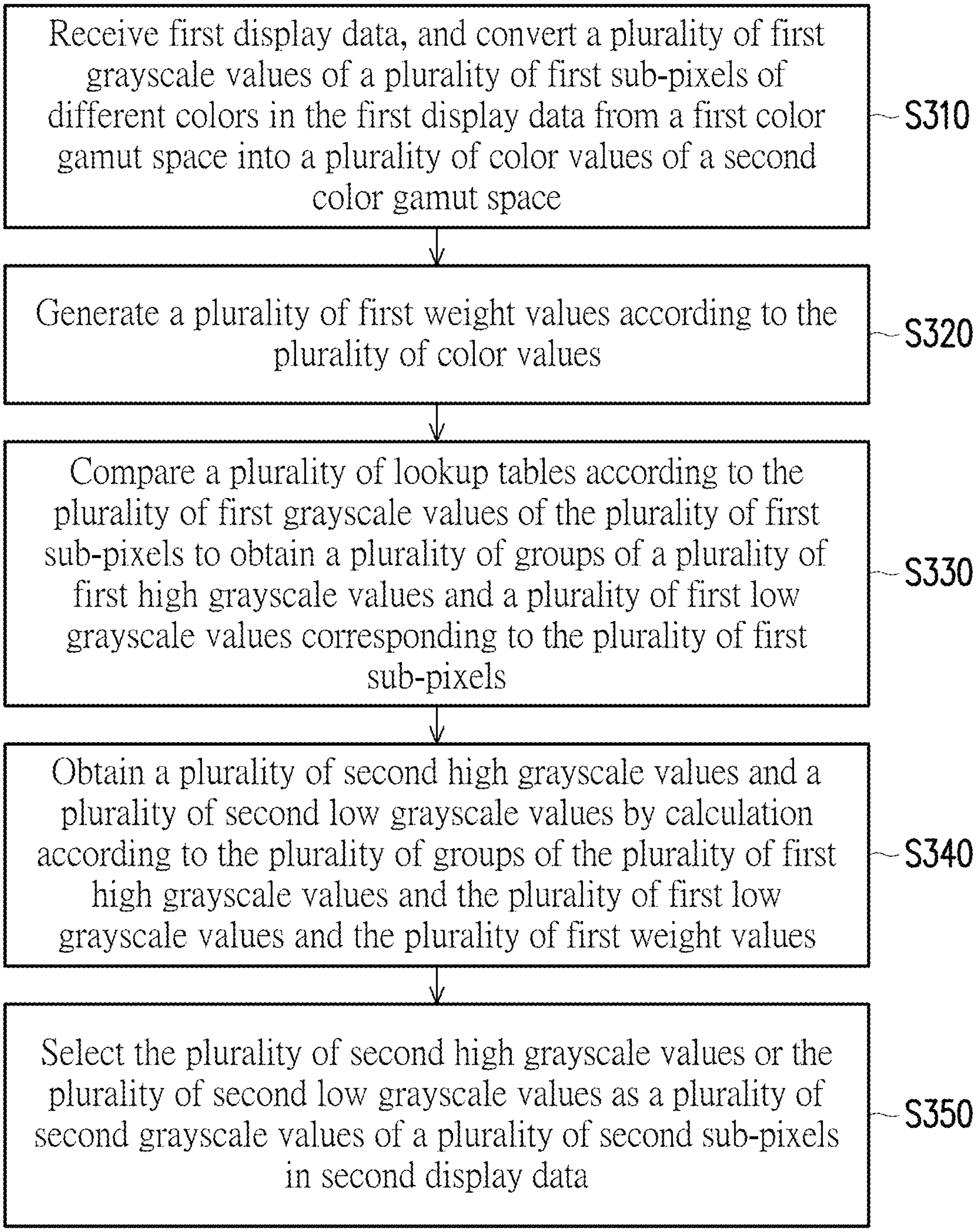
FIG. 3 is a flowchart of a display data adjustment method according to an embodiment of the disclosure.

FIG. 3 is a flowchart of a display data adjustment method according to an embodiment of the disclosure. With reference to FIG. 1 and FIG. 3, the electronic device 100 may perform steps S310 to S350 below for display data adjustment. In this embodiment, the controller 110 may receive the first display data D1 from the outside. In step S310, the display data adjustment module 111 receives the first display data D1, and may convert a plurality of first grayscale values of a plurality of first sub-pixels of different colors in the first display data D1 from a first color gamut space into a plurality of color values in a second color gamut space. For example, taking driving one pixel as an example, the first display data D1 may include a red sub-pixel grayscale value, a green sub-pixel grayscale value, and a blue sub-pixel grayscale value corresponding to one pixel. The display data adjustment module 111 may convert the red sub-pixel grayscale value, the green sub-pixel grayscale value, and the blue sub-pixel grayscale value from an RGB color gamut space into color values, such as a hue value, a saturation value, and a brightness value, in an HSV (hue, saturation, and lightness) color gamut space. Analogy may be accordingly made for display data adjustment for a plurality of pixels.

In step S320, the display data adjustment module 111 may generate a plurality of first weight values according to the plurality of color values. In step S330, the display data adjustment module 111 may compare a plurality of lookup tables according to the plurality of first grayscale values of the plurality of first sub-pixels to obtain a plurality of groups of a plurality of first high grayscale values and a plurality of first low grayscale values corresponding to the plurality of first sub-pixels. For example, taking one lookup table as shown in Table 1 below and obtaining of one group of a plurality of first high grayscale values and a plurality of first low grayscale values as an example, it is assumed that a red sub-pixel, a green sub-pixel, and a blue sub-pixel in the first display data D1 have grayscale values (254, 1, 255). The display data adjustment module 111 may search Table 1 below according to the grayscale values (254, 1, 255) to obtain one group of a plurality of high grayscale values and a plurality of low grayscale values as shown in Tables 2 to 4 below. Analogy may be accordingly made for a plurality of lookup tables and obtaining of a plurality of groups of grayscale values, but the disclosure is not limited thereto.

TABLE 1

| | Red sub-pixel | | Green sub-pixel | | Blue sub-pixel | |
|---|---|---|---|---|---|---|
| Grayscale value | High grayscale value | Low grayscale value | High grayscale value | Low grayscale value | High grayscale value | Low grayscale value |
| 0 | 0 | 0 | 0 | 0 | 0 | 0 |
| 1 | 4 | 0 | 5 | 0 | 6 | 0 |
| . . . | . . . | . . . | . . . | . . . | . . . | . . . |
| . . . | . . . | . . . | . . . | . . . | . . . | . . . |
| 254 | 255 | 253 | 255 | 253 | 255 | 252 |
| 255 | 255 | 255 | 255 | 255 | 255 | 255 |

TABLE 2

| Red sub-pixel | |
|---|---|
| High grayscale value | Low grayscale value |
| 255 | 253 |

TABLE 3

| Green sub-pixel | |
|---|---|
| High grayscale value | Low grayscale value |
| 5 | 0 |

TABLE 4

| Blue sub-pixel | |
|---|---|
| High grayscale value | Low grayscale value |
| 255 | 255 |

In step S340, the display data adjustment module 111 may obtain a plurality of second high grayscale values and a plurality of second low grayscale values by calculation according to the plurality of groups of the plurality of first high grayscale values and the plurality of first low grayscale values and the plurality of first weight values. In step S350, the display data adjustment module 111 may select the plurality of second high grayscale values or the plurality of second low grayscale values as a plurality of second grayscale values of a plurality of second sub-pixels in the second display data D2. In this embodiment, when the plurality of second sub-pixels in the second display data D2 is of a first pixel type, the display data adjustment module 111 may select the plurality of second high grayscale values as the plurality of second grayscale values of the plurality of second sub-pixels in the second display data D2. When the plurality of second sub-pixels in the second display data D2 is of a second pixel type, the display data adjustment module 111 may select the plurality of second low grayscale values as the plurality of second grayscale values of the plurality of second sub-pixels in the second display data D2. For example, the first pixel type may be a high grayscale pixel type, and the second pixel type may be a low grayscale pixel type. If the plurality of second grayscale values of the plurality of second sub-pixels in the second display data D2 are for driving the sub-pixels 211R_1, 211G_1, and 211B_1 of the high grayscale pixel type as shown in FIG. 2A, the display data adjustment module 111 may select the plurality of second high grayscale values obtained by calculation in step S340 above as the plurality of second grayscale values of the plurality of second sub-pixels in the second display data D2. Comparatively, if the plurality of second grayscale values of the plurality of second sub-pixels in the second display data D2 are for driving the sub-pixels 211R_2, 211G_2, and 211B_2 of the low grayscale pixel type as shown in FIG. 2A, the display data adjustment module 111 may select the plurality of second low grayscale values obtained by calculation in step S340 above as the plurality of second grayscale values of the plurality of second sub-pixels in the second display data D2. As such, the display data adjustment module 111 may dynamically adjust the display data to drive the display panel 120 to display with electrical low color shift through the second display data D2.

The specific implementations of generating the weight values and obtaining the grayscale values by calculation will be described in detail in the following embodiments of FIG. 4 to FIG. 9D.

Figure 4:
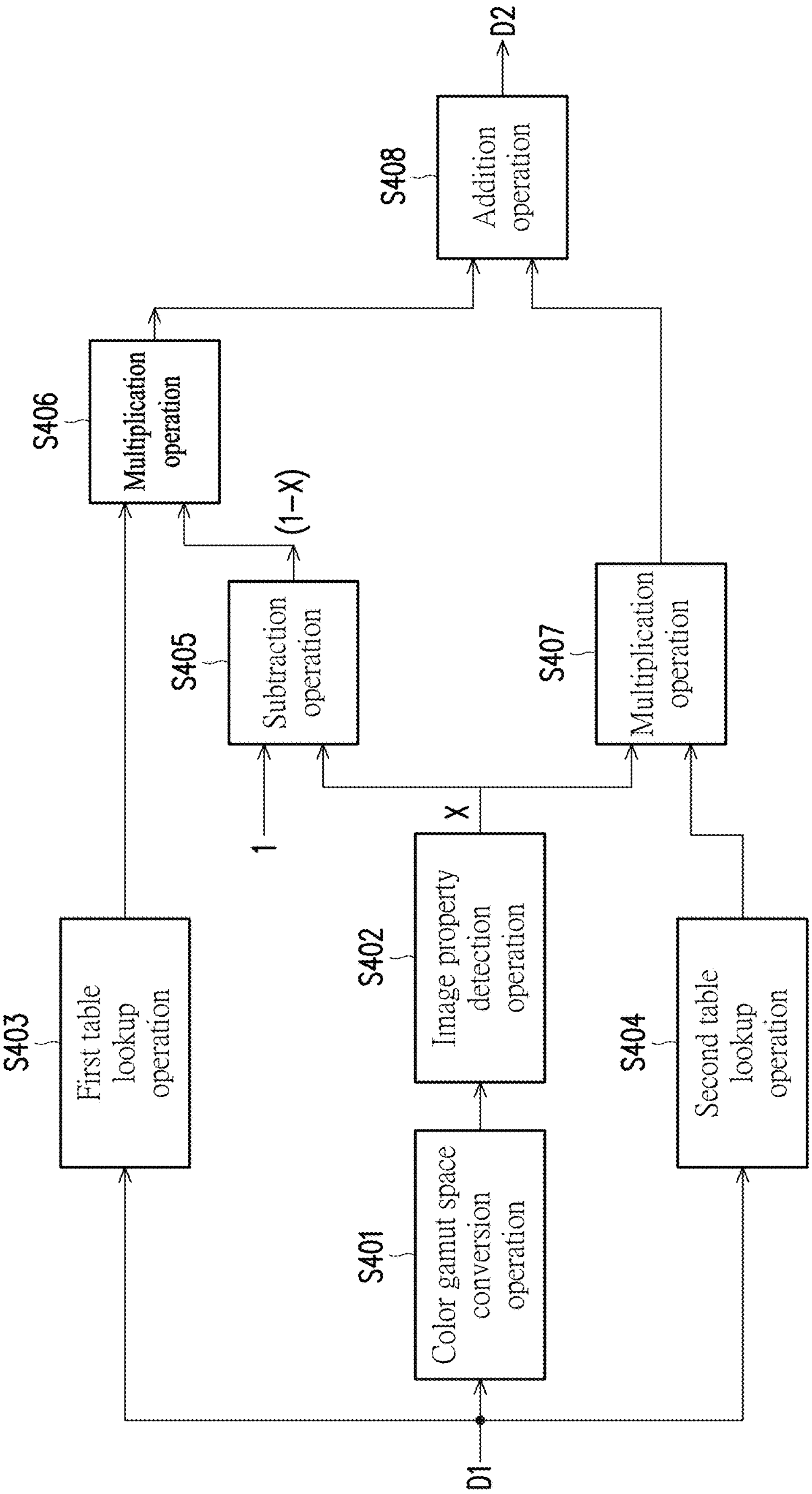
FIG. 4 is a schematic flowchart of display data adjustment according to an embodiment of the disclosure.

FIG. 4 is a schematic flowchart of display data adjustment according to an embodiment of the disclosure. With reference to FIG. 1 and FIG. 4, the display data adjustment module 111 of the controller 110 may perform steps S401 to S408 below to generate the second display data D2 according to the first display data D1. In step S401, the display data adjustment module 111 may perform a color gamut space conversion operation to convert a plurality of first grayscale values of a plurality of first sub-pixels of different colors in the first display data D1 from a first color gamut space into a plurality of color values in a second color gamut space. In step S402, the display data adjustment module 111 may perform an image property detection operation for determination according to the plurality of color values, and output a plurality of first weight values (X). In an embodiment, the image property detection may detect image skin color, but the disclosure is not limited thereto.

In an embodiment, when the display data adjustment module 111 performs skin color detection, the display data adjustment module 111 may determine whether a brightness value is less than a brightness threshold V1. When the brightness value is less than the brightness threshold V1, the display data adjustment module 111 may determine the plurality of first weight values (X) to be a first numerical value (e.g., a numerical value of "0"). Comparatively, when the brightness value is greater than or equal to the brightness threshold V1, the display data adjustment module 111 may determine a first reference value (e.g., expressed by Hf) according to a hue value and a plurality of hue thresholds, determine a second reference value (e.g., represented by Sf) according to a saturation value and a plurality of saturation thresholds, and take a result of multiplying the first reference value by the second reference value as the plurality of first weight values (X=Hf×Sf). Display data adjustment for one pixel (including three sub-pixels) is taken as an example for description below, but the disclosure is not limited thereto.

Figure 5A:
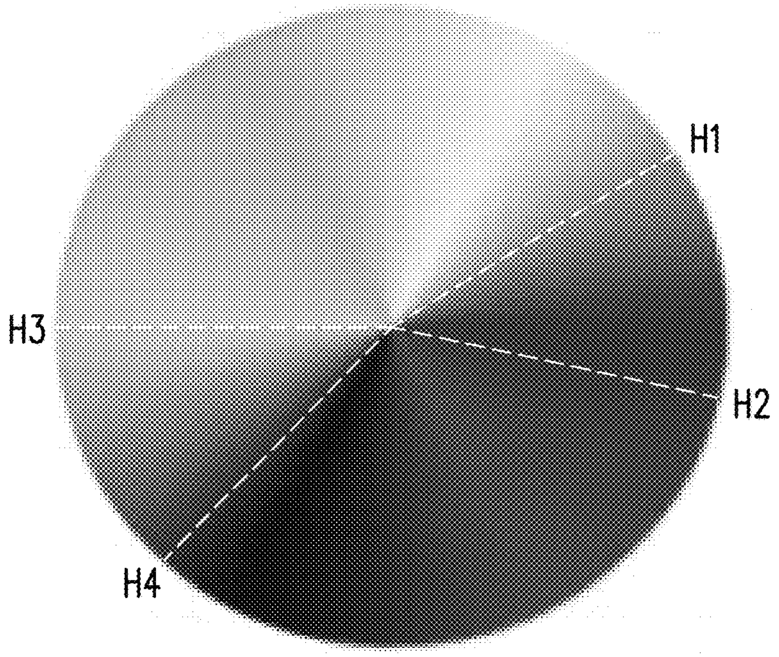
FIG. 5A is a schematic diagram of comparing a hue value according to an embodiment of the disclosure.

For example, reference may first be made to FIG. 5A, which is a schematic diagram of comparing a hue value according to an embodiment of the disclosure. FIG. 5A is a planar diagram of the relationships between hue values and saturation values in the HSV color gamut space. When the display data adjustment module 111 determines that the hue value is less than or equal to a first hue threshold H1 and is greater than or equal to a second hue threshold H2, the display data adjustment module 111 may determine the first reference value (Hf) to be a second numerical value (e.g., a numerical value of "1"). When the display data adjustment module 111 determines that the hue value is greater than the first hue threshold H1 and is less than a third hue threshold H3, the display data adjustment module 111 may obtain the first reference value (Hf is a numerical value ranging from 0 to 1) by interpolation calculation according to the first numerical value (e.g., a numerical value of "0") and the second numerical value (e.g., a numerical value of "1"). When the display data adjustment module 111 determines that the hue value is greater than or equal to the third hue threshold H3 and is less than or equal to a fourth hue threshold H4, the display data adjustment module 111 may determine the first reference value (Hf) to be the first numerical value (e.g., a numerical value of "0"). When the display data adjustment module 111 determines that the hue value is greater than the fourth hue threshold H4 and is less than the second hue threshold H2, the display data adjustment module 111 may obtain the first reference value (Hf is a numerical value ranging from 0 to 1) by interpolation calculation according to the first numerical value (e.g., numerical value "0") and the second numerical value (e.g., numerical value "1".

Figure 5B:
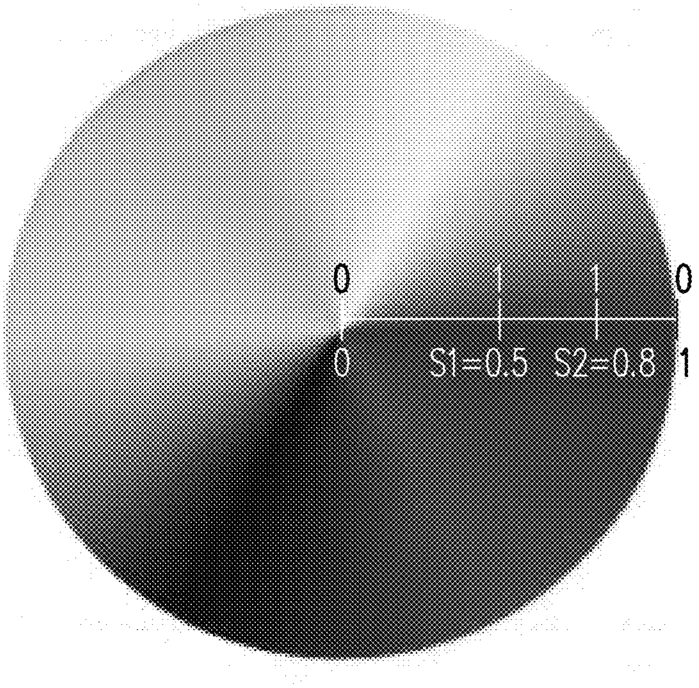
FIG. 5B is a schematic diagram of comparing a saturation value according to an embodiment of the disclosure.

For another example, reference may then be made to FIG. 5B, which is a schematic diagram of comparing a saturation value according to an embodiment of the disclosure. FIG. 5B is a planar diagram of the relationships between hue values and saturation values in the HSV color gamut space. When the display data adjustment module 111 determines that the saturation value is equal to a first value (e.g., S=0) or a second value (e.g., S=1), the display data adjustment module 111 determines the second reference value (Sf) to be the first numerical value (e.g., a numerical value of "0"). When the display data adjustment module 111 determines that the saturation value is less than or equal to a first saturation threshold S1 (e.g., S1=0.75) and is greater than or equal to a second saturation threshold S2 (e.g., S2=0.5), the display data adjustment module 111 may determine the second reference value (Sf) to be the second numerical value (e.g., a numerical value of "1"), where the first saturation threshold S1 (e.g., S1=0.75) is greater than the second saturation threshold S2 (e.g., S2=0.5). When the display data adjustment module 111 determines that the saturation value is greater than the first saturation threshold S1 (e.g., S1=0.75) or is less than the second saturation threshold S2 (e.g., S2=0.5), the display data adjustment module 111 obtains the second reference value (Sf is a numerical value ranging from 0 to 1) by interpolation calculation according to the first numerical value (e.g., a numerical value of "0") and the second numerical value (e.g., a numerical value of "1").

Next, in step S403, the display data adjustment module 111 performs a first table lookup operation, and compares the plurality of first grayscale values with a first lookup table to obtain a first group of a plurality of first high grayscale values and a plurality of first low grayscale values. The first lookup table may be designed with numerical values corresponding to, for example, a relatively low intensity of electrical low color shift, but the disclosure is not limited thereto. In step S404, the display data adjustment module 111 performs a second table lookup operation, and compares the plurality of first grayscale values with a second lookup table to obtain a second group of a plurality of first high grayscale values and a plurality of first low grayscale values. The second lookup table may be designed with numerical values corresponding to, for example, a relatively high intensity of electrical low color shift, but the disclosure is not limited thereto. In step S405, the display data adjustment module 111 performs a subtraction operation. The display data adjustment module 111 subtracts each of the plurality of first weight values (X) from the numerical value "1" to obtain a plurality of second weight values (1−X) by calculation according to the plurality of first weight values (X), where each of respective sums of the corresponding plurality of second weight values (1−X) added to the plurality of first weight values (X) is 1.

In step S406, the display data adjustment module 111 performs a multiplication operation. The display data adjustment module 111 multiplies the first group of the plurality of first high grayscale values and the plurality of first low grayscale values respectively by the plurality of second weight values to obtain a plurality of first operation values and a plurality of other first operation values. In step S407, the display data adjustment module 111 performs a multiplication operation. The display data adjustment module 111 multiplies the second group of the plurality of first high grayscale values and the plurality of first low grayscale values respectively by the plurality of first weight values (X) to obtain a plurality of second operation values and a plurality of other second operation values. In step S408, the display data adjustment module 111 performs an addition operation. The display data adjustment module 111 may respectively add the plurality of second operation values to the plurality of first operation values to obtain a plurality of second high grayscale values, and respectively add the plurality of other second operation values to the plurality of other first operation values to obtain a plurality of second low grayscale values. The display data adjustment module 111 may select the plurality of second high grayscale values or the plurality of second low grayscale values as a plurality of second grayscale values of a plurality of second sub-pixels in the second display data D2. As such, the display data adjustment module 111 of this embodiment may adjust the display data so as to obtain an adjustment result with a minimized sense of graininess of the non-skin color display part in the image displayed by the display panel 120 according to the second display data D2.

For example, reference may now be made to FIG. 6A to FIG. 6B, which are schematic diagrams of a first example of comparing a lookup table according to grayscale values according to an embodiment of the disclosure. It is assumed that a red sub-pixel, a green sub-pixel, and a blue sub-pixel in the first display data D1 have grayscale values (170, 89, 60). The first hue threshold H1 is 45 degrees. The second hue threshold H2 is 330 degrees. The third hue threshold H3 is 135 degrees. The fourth hue threshold H4 is 180 degrees. The first saturation threshold S1 is 0.1. The second saturation threshold S2 is 0.8. The brightness threshold V1 is 48. With reference to FIG. 4 together, corresponding to step S401 above, the display data adjustment module 111 may convert the grayscale values (170, 89, 60) in the RGB color gamut space into HSV values (16, 0.64, 170) in the HSV color gamut space. Corresponding to step S402 above, the display data adjustment module 111 may calculate that the first reference value Hf is 1 and the second reference value Sf is 1. Therefore, the display data adjustment module 111 may calculate that the first weight value X is 1 (i.e., the first reference value Hf multiplied by the second reference value Sf, and the display data adjustment module 111 determines that the color is a skin color). In addition, corresponding to step S405 above, the display data adjustment module 111 may calculate that the second weight value (1−X) is 0.

Next, corresponding to step S403 above, the display data adjustment module 111 may look up a table according to the grayscale values (170, 89, 60) to obtain a part 610 of the first lookup table as shown in FIG. 6A. The display data adjustment module 111 may obtain a first high grayscale value (RH=198) and a first low grayscale value (RL=155) of the red sub-pixel R, a first high grayscale value (GH=97) and a first low grayscale value (GL=81) of the green sub-pixel G, and a first high grayscale value (BH=62) and a first low grayscale value (BL=58) of the blue sub-pixel B in first groups 611 to 613.

Next, corresponding to step S404 above, the display data adjustment module 111 may look up a table according to the grayscale values (170, 89, 60) to obtain a part 620 of the second lookup table as shown in FIG. 6B. The display data adjustment module 111 may obtain a first high grayscale value (RH=230) and a first low grayscale value (RL=123) of the red sub-pixel R, a first high grayscale value (GH=130) and a first low grayscale value (GL=50) of the green sub-pixel G, and a first high grayscale value (BH=71) and a first low grayscale value (BL=3) of the blue sub-pixel B in second groups 621 to 623.

Lastly, corresponding to steps S406, S407, and S408 above, the display data adjustment module 111 may obtain a second high grayscale value (198×0+230×1=230) and a second low grayscale value (155×0+123×1=123) corresponding to the red sub-pixel R by calculation. The display data adjustment module 111 may obtain a second high grayscale value (97×0+130×1=130) and a second low grayscale value (81×0+50×1=50) corresponding to the green sub-pixel G by calculation. The display data adjustment module 111 may obtain a second high grayscale value (62×0+71×1=71) and a second low grayscale value (58×0+3×1=3) corresponding to the blue sub-pixel B by calculation.

For another example, reference may now be made to FIG. 6C to FIG. 6D, which are schematic diagrams of a second example of comparing a lookup table according to grayscale values according to an embodiment of the disclosure. It is assumed that a red sub-pixel, a green sub-pixel, and a blue sub-pixel in the first display data D1 have grayscale values (170, 170, 170). The first hue threshold H1 is 45 degrees. The second hue threshold H2 is 330 degrees. The third hue threshold H3 is 135 degrees. The fourth hue threshold H4 is 180 degrees. The first saturation threshold S1 is 0.1. The second saturation threshold S2 is 0.8. The brightness threshold V1 is 48. With reference to FIG. 4 together, corresponding to step S401 above, the display data adjustment module 111 may convert the grayscale values (170, 170, 170) in the RGB color gamut space into HSV values (0, 0, 170) in the HSV color gamut space. Corresponding to step S402 above, the display data adjustment module 111 may calculate that the first reference value Hf is 1 and the second reference value Sf is 0. Therefore, the display data adjustment module 111 may calculate that the first weight value X is 0 (i.e., the first reference value Hf multiplied by the second reference value Sf, and the display data adjustment module 111 determines that the color is a non-skin color). In addition, corresponding to step S405 above, the display data adjustment module 111 may calculate that the second weight value (1−X) is 1.

Next, corresponding to step S403 above, the display data adjustment module 111 may look up a table according to the grayscale values (170, 170, 170) to obtain a part 630 of the first lookup table as shown in FIG. 6C. The display data adjustment module 111 may obtain a first high grayscale value (RH=198) and a first low grayscale value (RL=155) of the red sub-pixel R, a first high grayscale value (GH=195) and a first low grayscale value (GL=160) of the green sub-pixel G, and a first high grayscale value (BH=182) and a first low grayscale value (BL=165) of the blue sub-pixel B in first groups 631 to 633.

Next, corresponding to step S404 above, the display data adjustment module 111 may look up a table according to the grayscale values (170, 170, 170) to obtain a part 640 of the second lookup table as shown in FIG. 6D. The display data adjustment module 111 may obtain a first high grayscale value (RH=230) and a first low grayscale value (RL=123) of the red sub-pixel R, a first high grayscale value (GH=224) and a first low grayscale value (GL=140) of the green sub-pixel G, and a first high grayscale value (BH=218) and a first low grayscale value (BL=152) of the blue sub-pixel B in second groups 641 to 643.

Lastly, corresponding to steps S406, S407, and S408 above, the display data adjustment module 111 may obtain a second high grayscale value (198×1+230×0=198) and a second low grayscale value (155×1+123×0=155) corresponding to the red sub-pixel R by calculation. The display data adjustment module 111 may obtain a second high grayscale value (195×1+224×0=195) and a second low grayscale value (160×1+140×0=160) corresponding to the green sub-pixel G by calculation. The display data adjustment module 111 may obtain a second high grayscale value (182×1+218×0=182) and a second low grayscale value (165×1+152×0=165) corresponding to the blue sub-pixel B by calculation.

For still another example, reference may now be made to FIG. 6E to FIG. 6F, which are schematic diagrams of a third example of comparing a lookup table according to grayscale values according to an embodiment of the disclosure. It is assumed that a red sub-pixel, a green sub-pixel, and a blue sub-pixel in the first display data D1 have grayscale values (170, 10, 60). The first hue threshold H1 is 45 degrees. The second hue threshold H2 is 330 degrees. The third hue threshold H3 is 135 degrees. The fourth hue threshold H4 is 180 degrees. The first saturation threshold S1 is 0.1. The second saturation threshold S2 is 0.8. The brightness threshold V1 is 48. With reference to FIG. 4 together, corresponding to step S401 above, the display data adjustment module 111 may convert the grayscale values (170, 10, 60) in the RGB color gamut space into HSV values (341, 0.94, 170) in the HSV color gamut space. Corresponding to step S402 above, the display data adjustment module 111 may calculate that the first reference value Hf is 1 and the second reference value Sf is 0.3. Therefore, the display data adjustment module 111 may calculate that the first weight value X is 0.3 (i.e., the first reference value Hf multiplied by the second reference value Sf, and the display data adjustment module 111 determines that the color is a skin color). In addition, corresponding to step S405 above, the display data adjustment module 111 may calculate the second weight value (1−X) to be 0.7.

Next, corresponding to step S403 above, the display data adjustment module 111 may look up a table according to the grayscale values (170, 10, 60) to obtain a part 650 of the first lookup table shown in FIG. 6E. The display data adjustment module 111 may obtain a first high grayscale value (RH=198) and a first low grayscale value (RL=155) of the red sub-pixel R, a first high grayscale value (GH=14) and a first low grayscale value (GL=7) of the green sub-pixel G, and a first high grayscale value (BH=62) and a first low grayscale value (BL=58) of the blue sub-pixel B in first groups 651 to 653.

Next, corresponding to step S404 above, the display data adjustment module 111 may look up a table according to the grayscale values (170, 10, 60) to obtain a part 660 of the second lookup table as shown in FIG. 6F. The display data adjustment module 111 may obtain a first high grayscale value (RH=230) and a first low grayscale value (RL=123) of the red sub-pixel R, a first high grayscale value (GH=18) and a first low grayscale value (GL=5) of the green sub-pixel G, and a first high grayscale value (BH=71) and a first low grayscale value (BL=3) of the blue sub-pixel B in second groups 661 to 663.

Lastly, corresponding to steps S406, S407, and S408 above, the display data adjustment module 111 may obtain a second high grayscale value (198×0.7+230×0.3=208) and a second low grayscale value (155×0.7+123×0.3=145) corresponding to the red sub-pixel R by calculation. The display data adjustment module 111 may obtain a second high grayscale value (14×0.7+18×0.3=15) and a second low grayscale value (7×0.7+5×0.3=6) corresponding to the green sub-pixel G by calculation. The display data adjustment module 111 may obtain a second high grayscale value (62×0.7+71×0.3=65) and a second low grayscale value (58×0.7+3×0.3=42) corresponding to the blue sub-pixel B by calculation.

Figure 7:
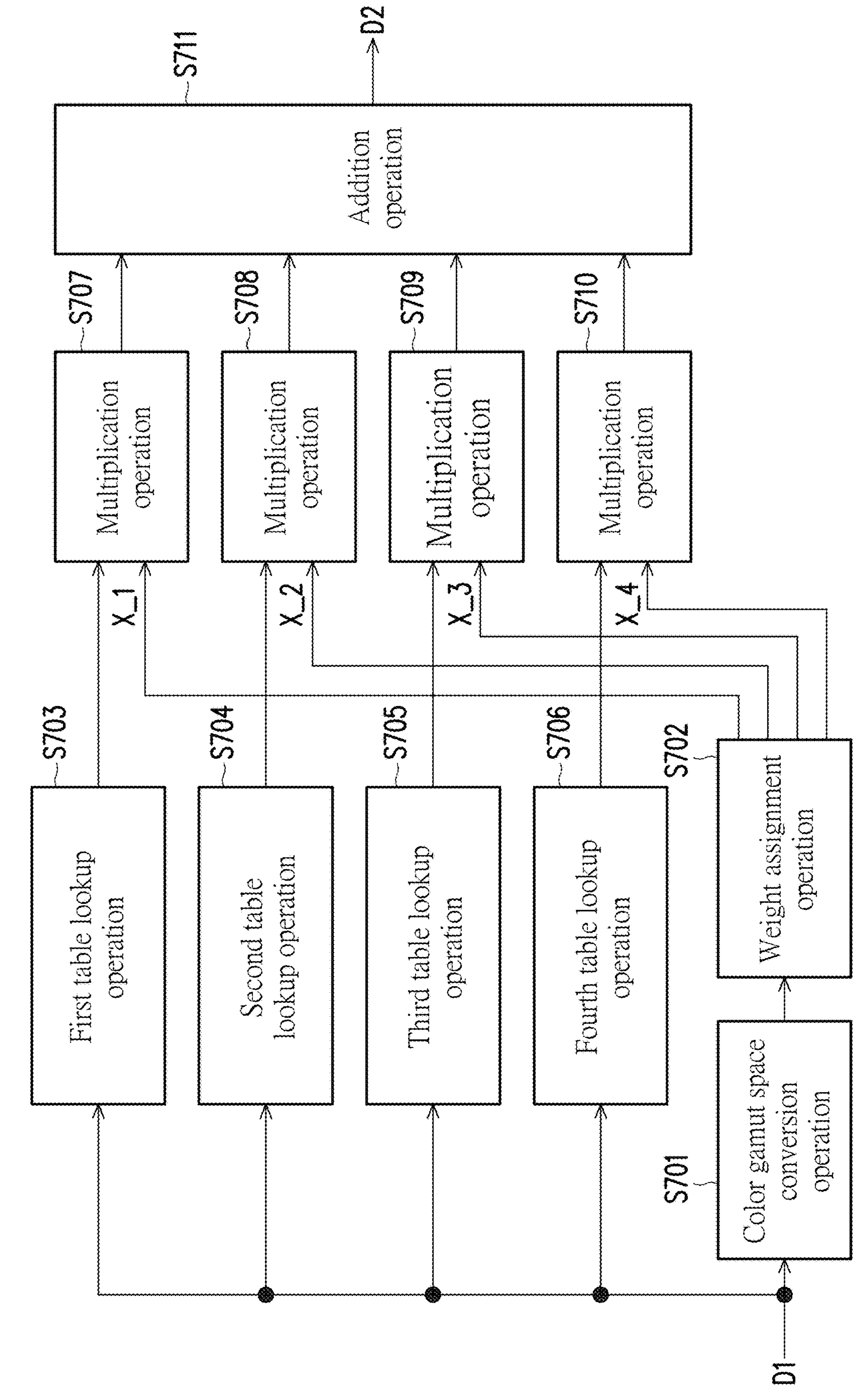
FIG. 7 is a schematic flowchart of display data adjustment according to another embodiment of the disclosure.

FIG. 7 is a schematic flowchart of display data adjustment according to another embodiment of the disclosure. The display data adjustment module 111 of the controller 110 may perform steps S701 to S711 below to generate the second display data D2 according to the first display data D1. In step S701, the display data adjustment module 111 may perform a color gamut space conversion operation to convert a plurality of first grayscale values of a plurality of first sub-pixels of different colors in the first display data D1 from a first color gamut space into a plurality of color values in a second color gamut space. In step S702, the display data adjustment module 111 may perform a weight assignment operation to generate and output a plurality of first weight values (X_1 to X_M, where M is a positive integer). In this embodiment, the display data adjustment module 111 may determine that the hue value is located in one of a plurality of hue regions to obtain the plurality of first weight values by calculation. However, the disclosure is not limited thereto. The first weight values may also be obtained by calculation according to the saturation value. The number of first weight values is equal to the number of lookup tables. In this regard, the display data adjustment module 111 may obtain the plurality of first weight values by interpolation calculation based on a plurality of hue benchmarks for dividing the plurality of hue regions. Moreover, during an interpolation calculation based on one of the plurality of hue benchmarks, the one of the plurality of hue benchmarks corresponds to a second numerical value (e.g., a numerical value of “1”), and two hue benchmarks adjacent to the one of the plurality of hue benchmarks correspond to a first numerical value (e.g., a numerical value of “0”).

Figure 8:
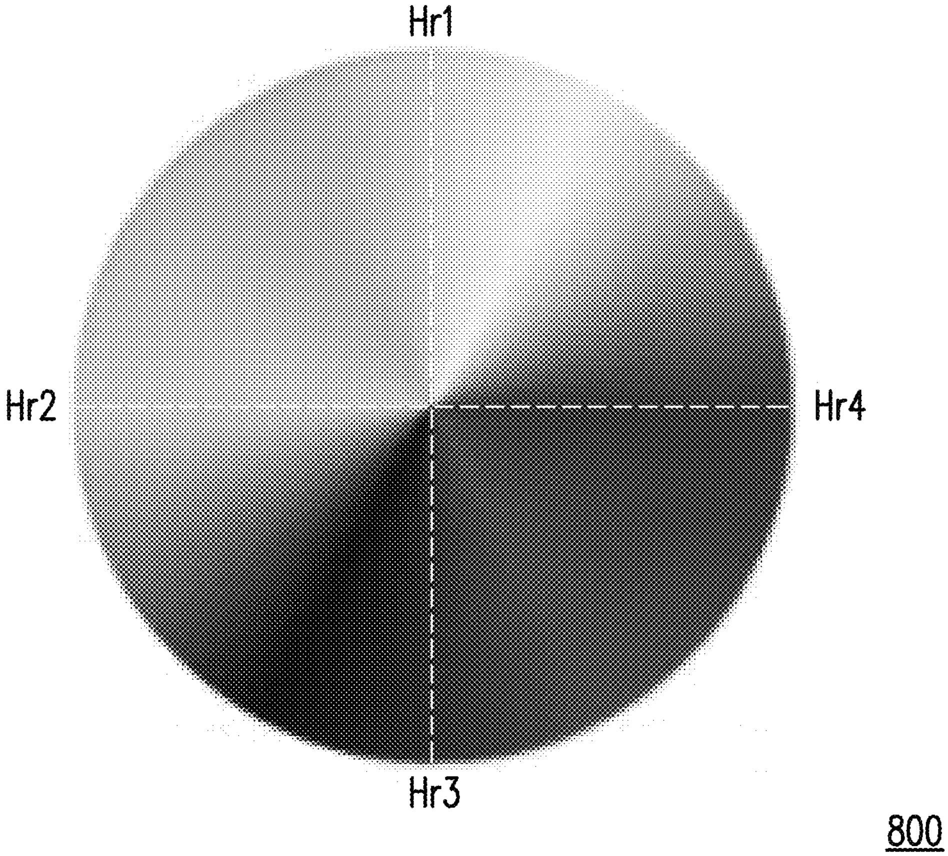
FIG. 8 is a schematic diagram of comparing a hue value according to another embodiment of the disclosure.

For example, reference may be made to FIG. 8, which is a schematic diagram of comparing a hue value according to another embodiment of the disclosure. FIG. 8 shows a planar diagram 800 of the relationships between hue values and saturation values in the HSV color gamut space. Taking the number of lookup tables being four as an example, and assuming that hue benchmarks Hr1 to Hr4 may respectively correspond to hue values of 90 degrees, 180 degrees, 270 degrees, and 360 degrees, for example. When the display data adjustment module 111 determines that the hue value is equal to 90 degrees, the display data adjustment module 111 may determine the first weight value X_1 to be 1, the first weight value X_2 to be 0, the first weight value X_3 to be 0, and the first weight value X_4 to be 0. When the display data adjustment module 111 determines that the hue value is equal to 180 degrees, the display data adjustment module 111 may determine the first weight value X_1 to be 0, the first weight value X_2 to be 1, the first weight value X_3 to be 0, and the first weight value X_4 to be 0. When the display data adjustment module 111 determines that the hue value is equal to 270 degrees, the display data adjustment module 111 may determine the first weight value X_1 to be 0, the first weight value X_2 to be 0, the first weight value X_3 to be 1, and the first weight value X_4 to be 0. When the display data adjustment module 111 determines that the hue value is equal to 360 degrees, the display data adjustment module 111 may determine the first weight value X_1 to be 0, the first weight value X_2 to be 0, the first weight value X_3 to be 0, and the first weight value X_4 to be 1. For another example, when the display data adjustment module 111 determines that the hue value is equal to 225 degrees, the display data adjustment module 111 may perform an interpolation calculation based on the hue benchmark 180 (assumed to correspond to a numerical value of "1") and the adjacent hue benchmark 270 (assumed to correspond to a numerical value of "0") to obtain the first weight value X_2 as 0.5, and may perform an interpolation calculation based on the hue benchmark 270 (assumed to correspond to a numerical value of "1") and the adjacent hue benchmark 180 (assumed to correspond to a numerical value of "0") to obtain the first weight value X_3 as 0.5. The first weight value X_1 and the first weight value X_4 are 0.

Next, in steps S703 to S706, the display data adjustment module 111 may perform four times of table lookup operations with four different lookup tables to obtain a plurality of groups of a plurality of first high grayscale values and a plurality of first low grayscale values. In steps S707 to S711, the display data adjustment module 111 may weight the plurality of groups of the plurality of first high grayscale values and the plurality of first low grayscale values according to the plurality of first weight values to obtain a plurality of second high grayscale values and a plurality of second low grayscale values. The display data adjustment module 111 may select the plurality of second high grayscale values or the plurality of second low grayscale values as a plurality of second grayscale values of a plurality of second sub-pixels in the second display data D2. As such, the display data adjustment module 111 of this embodiment may adjust the display data so as to obtain a better adjustment result for electrical low color shift of specific hues at the side viewing angle in the image displayed by the display panel 120 according to the second display data D2.

For example, reference may now be made to FIG. 9A to FIG. 9D, which are schematic diagrams of comparing a lookup table according to grayscale values according to another embodiment of the disclosure. It is assumed that a red sub-pixel, a green sub-pixel, and a blue sub-pixel in the first display data D1 have grayscale values (0, 100, 25). Taking the number of lookup tables being four as an example, with the following four lookup tables designed with numerical values corresponding to, for example, different intensities of electrical low color shift. Moreover, it is assumed that the four hue benchmarks may respectively be 90 degrees, 180 degrees, 270 degrees, and 360 degrees, for example.

Corresponding to step S701 above, the display data adjustment module 111 may convert the grayscale values (0, 100, 25) in the RGB color gamut space into HSV values (135, 1, 100) in the HSV color gamut space. Corresponding to step S702 above, according to a hue value of 135 between the hue benchmark of 90 degrees and the hue benchmark of 180 degrees, the display data adjustment module 111 may calculate that the first weight value X_1 is 0.5, the first weight value X_2 is 0.5, the first weight value X_3 is 0, and the first weight value X_4 is 0.

Next, corresponding to step S703 above, the display data adjustment module 111 may look up a table according to the grayscale values (0, 100, 25) to obtain a part 910 of a first lookup table as shown in FIG. 9A. The display data adjustment module 111 may obtain a first high grayscale value (RH=0) and a first low grayscale value (RL=0) of the red sub-pixel R, a first high grayscale value (GH=125) and a first low grayscale value (GL=77) of the green sub-pixel G, and a first high grayscale value (BH=29) and a first low grayscale value (BL=22) of the blue sub-pixel B in first groups 911 to 913.

Next, corresponding to step S704 above, the display data adjustment module 111 may look up a table according to the grayscale values (0, 100, 25) to obtain a part 920 of a second lookup table as shown in FIG. 9B. The display data adjustment module 111 may obtain a first high grayscale value (RH=0) and a first low grayscale value (RL=0) of the red sub-pixel R, a first high grayscale value (GH=138) and a first low grayscale value (GL=75) of the green sub-pixel G, and a first high grayscale value (BH=30) and a first low grayscale value (BL=19) of the blue sub-pixel B in first groups 921 to 923.

Next, corresponding to step S705 above, the display data adjustment module 111 may look up a table according to the grayscale values (0, 100, 25) to obtain a part 930 of a third lookup table as shown in FIG. 9C. The display data adjustment module 111 may obtain a first high grayscale value (RH=0) and a first low grayscale value (RL=0) of the red sub-pixel R, a first high grayscale value (GH=120) and a first low grayscale value (GL=81) of the green sub-pixel G, and a first high grayscale value (BH=35) and a first low grayscale value (BL=17) of the blue sub-pixel B in first groups 931 to 933.

Next, corresponding to step S706 above, the display data adjustment module 111 may look up a table according to the grayscale values (0, 100, 25) to obtain a part 940 of a fourth lookup table as shown in FIG. 9D. The display data adjustment module 111 may obtain a first high grayscale value (RH=0) and a first low grayscale value (RL=0) of the red sub-pixel R, a first high grayscale value (GH=115) and a first low grayscale value (GL=88) of the green sub-pixel G, and a first high grayscale value (BH=31) and a first low grayscale value (BL=18) of the blue sub-pixel B in first groups 941 to 943.

Lastly, corresponding to steps S707 to S711 above, the display data adjustment module 111 may obtain a second high grayscale value (0×0.5+0×0.5+0×0+0×0=0) and a second low grayscale value (0×0.5+0×0.5+0×0+0×0=0) corresponding to the red sub-pixel R by calculation. The display data adjustment module 111 may obtain a second high grayscale value (125×0.5+138×0.5+120×0+115×0=132) and a second low grayscale value (77×0.5+75×0.5+81×0+88×0=76) corresponding to the green sub-pixel G by calculation. The display data adjustment module 111 may obtain a second high grayscale value (29×0.5+30×0.5+35×0+31×0=30) and a second low grayscale value (22×0.5+19×0.5+17×0+18×0=21) corresponding to the blue sub-pixel B by calculation.

In summary of the foregoing, the display data adjustment method according to the embodiments of the disclosure can dynamically adjust the intensity of electrical low color shift displayed by the display panel in consideration of the grayscale value composition in sub-pixels of different colors. The display data adjustment method according to the embodiments of the disclosure can be used with special pixel arrangement of the pixel array of the display panel with electrical low color shift in a space, so that the display panel provides better displaying.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display data adjustment method comprising: receiving first display data, and converting a plurality of first grayscale values of a plurality of first sub-pixels of different colors in the first display data from a first color gamut space into a plurality of color values in a second color gamut space; generating a plurality of first weight values according to the plurality of color values; comparing a plurality of lookup tables according to the plurality of first grayscale values of the plurality of first sub-pixels to obtain a plurality of groups of a plurality of first high grayscale values and a plurality of first low grayscale values corresponding to the plurality of first sub-pixels; obtaining a plurality of second high grayscale values and a plurality of second low grayscale values by calculation according to the plurality of groups of the plurality of first high grayscale values and the plurality of first low grayscale values and the plurality of first weight values; and selecting the plurality of second high grayscale values or the plurality of second low grayscale values as a plurality of second grayscale values of a plurality of second sub-pixels in second display data, wherein obtaining the plurality of second high grayscale values and the plurality of second low grayscale values by calculation comprises: obtaining a plurality of second weight values by calculation according to the plurality of first weight values, where each of respective sums of the corresponding plurality of second weight values added to the plurality of first weight values is 1; multiplying the first group of the plurality of first high grayscale values and the plurality of first low grayscale values respectively by the plurality of second weight values to obtain a plurality of first operation values and a plurality of other first operation values; multiplying the second group of the plurality of first high grayscale values and the plurality of first low grayscale values respectively by the plurality of first weight values to obtain a plurality of second operation values and a plurality of other second operation values; and respectively adding the plurality of second operation values to the plurality of first operation values to obtain the plurality of second high grayscale values, and respectively adding the plurality of other second operation values to the plurality of other first operation values to obtain the plurality of second low grayscale values.

2. The display data adjustment method according to claim 1, wherein obtaining the plurality of groups of the plurality of first high grayscale values and the plurality of first low grayscale values comprises:

comparing the plurality of first grayscale values with a first lookup table to obtain a first group of the plurality of first high grayscale values and the plurality of first low grayscale values; and comparing the plurality of first grayscale values with a second lookup table to obtain a second group of the plurality of first high grayscale values and the plurality of first low grayscale values.

3. The display data adjustment method according to claim 1, wherein the plurality of first grayscale values respectively correspond to red, blue, and green, and the plurality of color values comprise a hue value, a saturation value, and a brightness value.

4. The display data adjustment method according to claim 3, wherein generating the plurality of first weight values according to the plurality of color values comprises:

determining whether the brightness value is less than a brightness threshold;

determining the plurality of first weight values to be a first numerical value when the brightness value is less than the brightness threshold; and determining a first reference value according to the hue value and a plurality of hue thresholds, determining a second reference value according to the saturation value and a plurality of saturation thresholds, and taking a result of multiplying the first reference value by the second reference value as the plurality of first weight values when the brightness value is greater than or equal to the brightness threshold.

5. The display data adjustment method according to claim 4, wherein determining the first reference value comprises:

determining the first reference value to be a second numerical value when the hue value is less than or equal to a first hue threshold or is greater than a second hue threshold;

obtaining the first reference value by interpolation calculation according to the first numerical value and the second numerical value when the hue value is greater than the first hue threshold and is less than or equal to a third hue threshold;

determining the first reference value to be the first numerical value when the hue value is greater than the third hue threshold and is less than or equal to a fourth hue threshold; and obtaining the first reference value by interpolation calculation according to the first numerical value and the second numerical value when the hue value is greater than the fourth hue threshold and is less than or equal to the second hue threshold.

6. The display data adjustment method according to claim 5, wherein the first reference value is a numerical value ranging from 0 to 1.

7. The display data adjustment method according to claim 4, wherein determining the second reference value comprises:

determining the second reference value to be the first numerical value when the saturation value is equal to the first numerical value or a second numerical value;

determining the second reference value to be the second numerical value when the saturation value is less than or equal to a first saturation threshold and is greater than or equal to a second saturation threshold, where the first saturation threshold is greater than the second saturation threshold; and obtaining the second reference value by interpolation calculation according to the first numerical value and the second numerical value when the saturation value is greater than the first saturation threshold or is less than the second saturation threshold.

8. The display data adjustment method according to claim 7, wherein the second reference value is a numerical value ranging from 0 to 1.

9. The display data adjustment method according to claim 3, wherein generating the plurality of first weight values according to the plurality of color values comprises:

determining that the hue value is located in one of a plurality of hue regions to obtain the plurality of first weight values by calculation, and wherein obtaining the plurality of second high grayscale values and the plurality of second low grayscale values by calculation comprises:

weighting the plurality of groups of the plurality of first high grayscale values and the plurality of first low grayscale values according to the plurality of first weight values to obtain the plurality of second high grayscale values and the plurality of second low grayscale values.

10. The display data adjustment method according to claim 9, wherein obtaining the plurality of first weight values by calculation comprises:

obtaining the plurality of first weight values by interpolation calculation based on a plurality of hue benchmarks for dividing the plurality of hue regions, wherein during an interpolation calculation based on one of the plurality of hue benchmarks, the one of the plurality of hue benchmarks corresponds to a second numerical value, and two hue benchmarks adjacent to the one of the plurality of hue benchmarks correspond to a first numerical value.

11. The display data adjustment method according to claim 10, wherein the plurality of hue benchmarks comprise four hue benchmarks.

12. The display data adjustment method according to claim 11, wherein the plurality of hue benchmarks are respectively 90 degrees, 180 degrees, 270 degrees, and 360 degrees.

13. The display data adjustment method according to claim 1, wherein the plurality of second high grayscale values correspond to a first pixel type, and the plurality of second low grayscale values correspond to a second pixel type, and wherein selecting the plurality of second high grayscale values or the plurality of second low grayscale values as the plurality of second grayscale values of the plurality of second sub-pixels in the second display data comprises:

selecting the plurality of second high grayscale values as the plurality of second grayscale values of the plurality of second sub-pixels in the second display data when the plurality of second sub-pixels in the second display data is of the first pixel type; and selecting the plurality of second low grayscale values as the plurality of second grayscale values of the plurality of second sub-pixels in the second display data when the plurality of second sub-pixels in the second display data is of the second pixel type.

14. The display data adjustment method according to claim 1, wherein the second display data is for driving a display panel, the display panel comprises a pixel array, and the pixel array comprises a plurality of sub-pixels of a first pixel type and a second pixel type.

15. The display data adjustment method according to claim 14, wherein the first pixel type is a high grayscale pixel type, and the second pixel type is a low grayscale pixel type.

16. The display data adjustment method according to claim 15, wherein the plurality of second high grayscale values are for driving the plurality of sub-pixels of the high grayscale pixel type, and the plurality of second low grayscale values are for driving the plurality of sub-pixels of the low grayscale pixel type.

17. The display data adjustment method according to claim 15, wherein the plurality of sub-pixels of the high grayscale pixel type and the plurality of sub-pixels of the low grayscale pixel type are alternately arranged in a manner of line insertion.

18. The display data adjustment method according to claim 15, wherein the plurality of sub-pixels of the high grayscale pixel type and the plurality of sub-pixels of the low grayscale pixel type are alternately arranged in a manner of 2-dot insertion.

19. The display data adjustment method according to claim 1, wherein the first color gamut space is an RGB color gamut space, and the second color gamut space is an HSV color gamut space.

* * * * *